No. 657,060. Patented Aug. 28, 1900.
R. J. BURNS.
VALVE ATTACHING DEVICE FOR BICYCLE TIRES.
(Application filed Dec. 5, 1899.)
(No Model.)
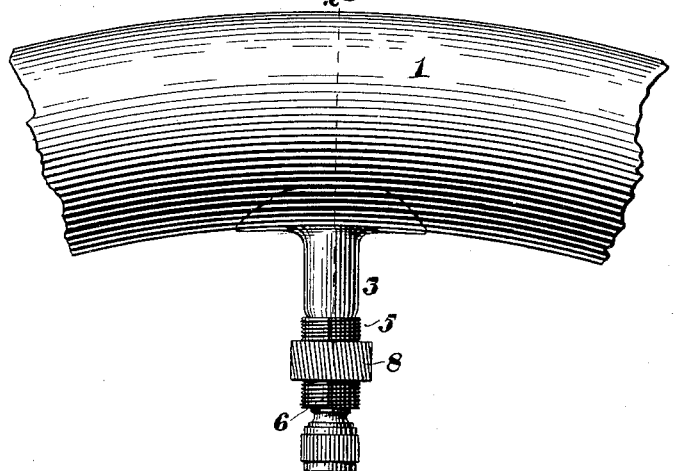
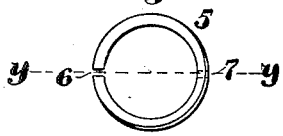
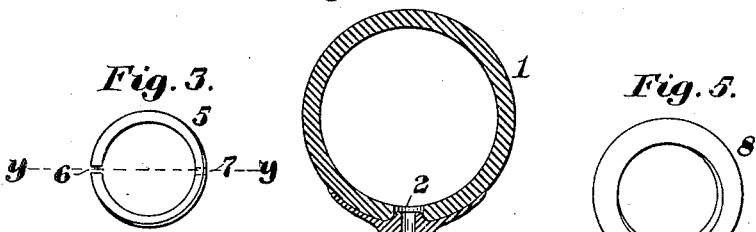
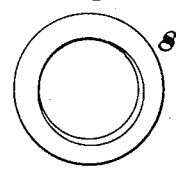
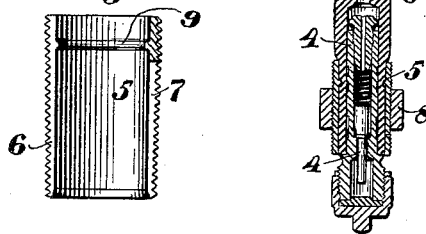
Witnesses:
Walter E. Lombard
N. C. Lombard 2nd
Inventor:
Robert J. Burns,
by N. C. Lombard
Atty.

UNITED STATES PATENT OFFICE.

ROBERT J. BURNS, OF AVON, MASSACHUSETTS, ASSIGNOR, BY DIRECT AND MESNE ASSIGNMENTS, OF FIVE-EIGHTHS TO LESLIE H. HALL, OF SAME PLACE, AND FRANK C. GRANGER, OF RANDOLPH, MASSACHUSETTS.

VALVE-ATTACHING DEVICE FOR BICYCLE-TIRES.

SPECIFICATION forming part of Letters Patent No. 657,060, dated August 28, 1900.

Application filed December 5, 1899. Serial No. 739,230. (No model.)

*To all whom it may concern:*

Be it known that I, ROBERT J. BURNS, of Avon, in the county of Norfolk and State of Massachusetts, have invented a new and useful Improvement in Valve-Attaching Devices for Bicycle-Tires, of which the following, taken in connection with the accompanying drawings, is a specification.

My invention relates to valve-attaching devices for bicycle-tires, and is especially adapted for use upon that class of tires in which the valve and its casing are connected to the tire by means of a tube of rubber cemented to the periphery of the tire and projecting therefrom toward the axis of the wheel when the tire is placed in position upon the rim of the wheel; and it consists in certain novel features of construction, arrangement, and combination of parts, which will be readily understood by reference to the description of the accompanying drawings and to the claims hereto appended and in which my invention is clearly pointed out.

Figure 1 of the drawings is a side elevation of a small section of a pneumatic bicycle-tire with valve and valve-tube attached thereto and illustrating my invention. Fig. 2 is a transverse section of the same on line $x\,x$ on Fig. 1, but showing the valve in elevation. Fig. 3 is a plan of the split clamping-sleeve. Fig. 4 is a sectional elevation of the same, the cutting plane being on line $y\,y$ on Fig. 3. Fig. 5 is a plan of the binding-nut, and Fig. 6 is a section of the same. Figs. 3, 4, 5, and 6 are drawn to an enlarged scale.

In the drawings, 1 represents a small section of an ordinary pneumatic tire having a perforation 2 formed therein, over which is cemented to said tire the flanged rubber tube 3, in which is inserted the valve-casing 4, provided with suitable valve-seats and having fitted therein suitable valves, which valves, valve-seats, and the casing may be of any well-known construction and form no part of my present invention, and therefore need not be described in detail here. A metal sleeve 5, having an internal diameter when in its normal or uncompressed condition sufficiently large to permit it to pass freely over the tube 3, is split entirely through longitudinally on one side, as at 6, and nearly through on the other side, as at 7, is slipped over said tube 3 after the valve-casing, with its valve, has been placed in position therein. The sleeve 5 has formed upon its inner surface the annular bead 9, as shown in Fig. 4. Exteriorly the sleeve 5 is made slightly tapering, being largest at the end which when placed in position is farthest from the tire and is threaded from end to end. A ring-nut 8 is fitted to said sleeve in such a manner that as it is screwed thereon from the smallest end of said sleeve it will compress said sleeve and cause it to clamp said rubber tube 3 firmly upon the valve-casing and hold it firmly in position.

When the valve-casing is placed in the tube 3 in its proper position, the nut 8 is slipped over the tube 3 into proximity to the tire. The sleeve is then slipped over said tube 3 into the desired position, and then the nut 8 is brought into engagement with the thread on said sleeve at its smaller end and screwed thereon toward its larger end until the rubber tube is firmly clamped to the valve-casing and the bead 9 is pressed into the rubber tube.

By the employment of this attaching device the valve-casing may be readily removed, repaired, and replaced without detaching the flanged tube 3 from the tire, as has heretofore been necessary. This is a very great advantage.

What I claim as new, and desire to secure by Letters Patent of the United States, is—

1. As a means of securing the valve-casing in a rubber air-inlet tube of a bicycle-tire, a metal sleeve made tapering and threaded upon its exterior and split entirely through, longitudinally, on one side, and nearly through upon the opposite side, and approximately fitting the exterior of said rubber inlet-tube in its normal condition; and a nut fitted to said sleeve and arranged to compress said sleeve to clamp it upon said tube, and said tube to the valve-casing.

2. In combination with a pneumatic tire provided with a rubber air-inlet tube, and a valve-casing inserted in said inlet-tube, the sleeve 5 provided with the slits 6 and 7, and annular bead 9, and having a screw-thread formed upon its tapering exterior; and the nut 8, the threaded perimeter of which is fitted to the smaller end of said sleeve, and adapted to compress said sleeve as it is screwed toward the larger end thereof, and cause it to clamp said rubber tube firmly to said valve-casing.

In testimony whereof I have signed my name to this specification, in the presence of two subscribing witnesses, on this 2d day of December, A. D. 1899.

ROBERT J. BURNS.

Witnesses:
N. C. LOMBARD,
W. H. JAMES.